United States Patent
Kopolow et al.

(10) Patent No.: US 6,806,310 B2
(45) Date of Patent: Oct. 19, 2004

(54) COATED SUBSTRATES FOR COMPUTER PRINTERS

(75) Inventors: Stephen L. Kopolow, Plainsboro, NJ (US); Drupesh Patel, Lake Hiawatha, NJ (US); Michael Tallon, Aberdeen, NJ (US)

(73) Assignee: ISP Investments Inc., Wilmington, DE (US)

( * ) Notice: Subject to any disclaimer, the term of this patent is extended or adjusted under 35 U.S.C. 154(b) by 2 days.

(21) Appl. No.: 10/153,411

(22) Filed: May 22, 2002

(65) Prior Publication Data

US 2003/0217825 A1 Nov. 27, 2003

(51) Int. Cl.$^7$ .................................................. C08F 2/10
(52) U.S. Cl. ...................... 524/767; 524/555; 524/556; 524/560; 524/831; 526/212; 526/307.7
(58) Field of Search ............................ 526/212, 307.7; 347/105; 524/555, 556, 558, 560, 767, 819, 820, 823, 831

(56) References Cited

U.S. PATENT DOCUMENTS

| | | | | |
|---|---|---|---|---|
| 4,107,418 A | * | 8/1978 | Yatsu et al. | 526/184 |
| 5,110,582 A | * | 5/1992 | Hungerbuhler et al. | 424/47 |
| 5,576,403 A | * | 11/1996 | Chandran et al. | 526/212 |
| RE36,042 E | * | 1/1999 | Landy et al. | 524/521 |
| 6,361,768 B1 | * | 3/2002 | Galleguillos et al. | 424/70.12 |

* cited by examiner

*Primary Examiner*—Peter Chin
(74) *Attorney, Agent, or Firm*—Walter Katz; William J. Davis

(57) ABSTRACT

Copolymers of dimethylaminopropyl methacrylamide and hydroxyethyl methacrylate having residual monomer levels of <2000 ppm and <500 ppm, respectively, are made by copolymerizing the monomers in a predetermined weight ratio in an aqueous-alcoholic solvent of defined composition. Substrates coated with these copolymers are capable of absorbing the solvents, e.g. water or organic solvents, of digital printing inks rapidly with dry times of <1 min.

7 Claims, No Drawings ized by their low residual monomer levels, particularly <2000 ppm and <500 ppm, respectively, and predetermined viscosity, which properties advance their commercial utilization in coated papers used in computer printers, e.g. inkjet printers. These copolymers are made herein by a polymerization process in which the monomers are copolymerized in a defined cosolvent system, particularly an aqueous-alcoholic mixture, preferably aqueous-isopropanol (IPA) mixtures, whose solvent ratios are predetermined by the selected ratio of monomers in the copolymer. Specifically, neither water or isopropanol alone as solvent will produce acceptable copolymers; however, predetermined mixtures of water and isopropanol, selected for a given ratio of monomers, will provide copolymers with advantageously low residual monomer levels, suitable viscosities, and, inkjet coatings which are water-resistant of excellent print quality and dry fast.

COATED SUBSTRATES FOR COMPUTER PRINTERS

BACKGROUND OF THE INVENTION

1. Field of the Invention

This invention relates to polymers used in making paper suitable for use in computer printers, using water or solvent based inks, and, more particularly, to coated papers which exhibit advantageous water-fastness, excellent image quality, and dry fast.

2. Description of the Prior Art

The advent of color inkjet printing has been instrumental in fueling the print-on-demand revolution and has also created a number of challenges. Often, the surface of the desired media does not possess the necessary properties for accepting the ink-jet ink. This results in long dry times and/or a poor ink-jet image. It has long been recognized that a surface treatment or media coating plays a critical role in the final print quality. Numerous media coatings are known in the art. They may contain any number of components and often consist of more than one layer. These ink-receptive coatings generally contain at least one hydrophilic polymer; often poly(vinylpyrrolidone) (PVP). PVP brings many benefits to properly formulated media coatings including rapid ink dry time, excellent print quality, highly resolved circular dots, and high, uniform optical density. Furthermore, copolymers of vinylpyrrolidone (VP) along with other suitable comonomers, such as dimethylaminoethyl methacrylamide (DMAPMA), acrylic acid, or vinyl acetate, have been used separately or in conjunction with PVP, to further optimize performance. However, it is desired also to provide fast dry times of solvents in the inks, and water-fastness qualities for such films.

Landy, F., in U.S. Pat. No. 5,527,853, discloses a copolymer of dimethylaminopropyl methacrylamide (DMAPMA) and hydroxyethyl methacrylate (HEMA); however, without description of its preparation or further characterization.

SUMMARY OF THE INVENTION

What is described herein is an uncrosslinked or crosslinked copolymer of dimethylaminopropyl methacrylamide (DMAPMA) monomer and hydroxyethyl methacrylate (HEMA) monomer having residual monomer levels of <2000 ppm and <500 ppm, respectively, preferably in a weight ratio of DMAPMA:HEMA of about 60–70:40–30, prepared by copolymerizing the monomers in an aqueous-alcohol solvent, e.g. with isopropanol, wherein the desired weight ratio of DMAPMA:HEMA predetermines the weight ratio of water:alcohol to be used during the polymerization. In particular, a higher HEMA content in the copolymer requires a greater amount of alcohol in the cosolvent.

The product of the polymerization is an aqueous-alcoholic solution which has a pH of about 9–11, a solids content of about 29–31%, and a Brookfield viscosity of about 1,000 to 20,000 cps [LV #4, 12 rpm @25° C.].

A substrate is coated with the copolymer of the invention, e.g. paper, glass or plastic, which is capable of absorbing the solvents, e.g. water or organic solvents, of digital printing inks rapidly, i.e. with dry times of <1 min.

DETAILED DESCRIPTION OF THE INVENTION

The DMAPMA-HEMA copolymers of the invention are particularly characterized by their low residual monomer The invention will now be described by reference to the following examples.

EXAMPLE 1

Preparation of DMAPMA/HEMA Copolymer, Weight Ratio, 70/30, in IPA/Water

1. Set up a 1.0 liter resin kettle fitted with anchor type agitator, thermocouple, and nitrogen purge.
2. Charge 187.25 g of DI water, 143.50 g of IPA, and 105.00 g of DMAPMA.
3. Start stirring at 300 rpm.
4. Purge the reaction mixture with nitrogen for 30 minutes.
5. During purging of the reaction mixture, prepare feed solution of 45.00 g of HEMA. Purge this solution with nitrogen.
6. After purging the reaction mixture with nitrogen, start heating to 75° C.
7. During heating, add a feeding solution of HEMA to pump.
8. At 75° C., add precharge 2.25 g [2.097 ml] of HEMA to the reactor.

Perform Step 9 and 10 Simultaneously

9. At time=0 minute, start feeding HEMA 42.75 g over 4 hours of addition time.
10. Add the first shot of Vazo-67 by dissolving 0.125 g of Vazo-67 in 1.25 g of isopropanol.
11. Then add 13 additional shots of Vazo-67 by dissolving 0.125 g of Vazo-67 in 1.25 g of isopropanol at 30, 90, 150, 210, 270, 360, 480, 600, 720, 840, 960, and 1020, 1080 minutes.
12. Check the sample for residual HEMA and DMAPMA before taking samples at 1020, 1080 minutes.
13. When residual DMAPMA and HEMA levels are less than 2000 ppm and 500 ppm, respectively, stop heating, cool down and transfer.

| PRODUCT CHARACTERISTICS | |
|---|---|
| Residual HEMA | Less than 500 ppm |
| Residual DMAPMA | Less than 2000 ppm |
| pH | 9.0 to 11.0 |
| % Solids | 29 to 31% |
| Brookfield Viscosity | 1000 to 20000 cps |
| | [LV# 4, 12 rpm @ 25° C.] |
| Haze | Less than 100 ntu |
| APHA Color | Less than 100 |

EXAMPLE 2

Preparation of DMAPMA/HEMA Copolymer, Weight Ratio, 60/40 in IPA/Water

1. Set up a 1.0 liter resin kettle fitted with anchor type agitator, thermocouple, and nitrogen purge.

2. Then charge 173.25 g of DI water, 157.50 g of isopropanol, and 90.00 g of DMAPMA.
3. Start stirring at 300 rpm stirring rate.
4. Purge the reaction mixture with nitrogen for 30 minutes.
5. During purging the reaction mixture, prepare feed solution of 60.00 g of HEMA. Also purged this solution with nitrogen.
6. After purging the reaction mixture with nitrogen, start heating to 75° C.
7. During heating reaction mixture to 75° C., add the feeding solution of HEMA to pump.
8. At 75° C., add precharge 3.00 g [2.796 ml] of HEMA to the reactor.

Perform Step 9 and 10 Simultaneously

9. Then time=0 minute, start feeding of HEMA 57.00 g in 4 hours of addition time.
10. Also add the first shot of Vazo-67 by dissolving 0.125 g of Vazo-67 in 1.25 g of isopropanol.
11. Then add the other 13 shots of Vazo-67 by dissolving 0.125 g of Vazo-67 in 1.25 g of isopropanol at 30, 90,150, 210, 270, 360, 480, 600, 720, 840, 960, and 1020,1080 minutes.
12. Check the sample for residual HEMA and DMAPMA before taking samples at 1020,1080 minutes.
13. When HEMA and DMAPMA residuals are less than 500 ppm and 2000 ppm, respectively, stop heating, cool down and transfer.

PRODUCT CHARACTERISTICS

| Residual HEMA | Less than 500 ppm |
| Residual DMAPMA | Less than 2000 ppm |
| pH | 9.0 to 11.0 |
| % Solids | 29 to 31% |
| Brookfield Viscosity | 1000 to 20000 cps [LV# 4, 12 rpm @ 25° C.] |
| Haze | Less than 100 ntu |
| APHA Color | Less than 100 |

Examples 3–6 below show the effect on product characteristics of using water alone, or IPA alone, or IPA/water mixtures, as solvent for different copolymer weight ratios. The results show that each solvent alone produces only poor quality copolymer, while mixtures of each solvent, at ratios predetermined by the ratios of monomers, produce high quality copolymers, provide low residuals and good viscosities, i.e. no gel.

In general, a higher weight ratio of HEMA requires a greater amount of alcohol in the alcohol/water cosolvent.

EXAMPLE 3

Preparation of DMAPMA/HEMA Crosslinked Copolymer, Weight Ratio 60/40 in IPA/Water 1. Set up a 1.0 liter resin kettle fitted with anchor agitator, thermocouple, and nitrogen purge.
2. Charge 173.0 g of DI water, 157.0 g of IPA, 90 g of DMAPMA, and 0.25 g pentaerythritol triallyl ether.
3. Start stirring at 300 rpm.
4. Purge the reaction mixture with nitrogen for 30 minutes.
5. During purging of the reaction mixture, prepare the feed solution of 60 g of HEMA. Purge this solution with nitrogen.
6. After purge complete heat to 75° C.
7. During heating, add the feed solution of HEMA to a pump.
8. At 75° C., add a precharge of 2.8 g of HEMA to the reactor.

Perform Step 9 and 10 simultaneously

9. At time=0 minute, start feeding the HEMA (42.74 g) over 4 hours of addition time.
10. Add the first shot of Vazo-67 by dissolving 0.125 g of Vazo-67 in 1.25 g isopropanol.
11. Then add 13 additional shots of Vazo-67 by dissolving 0.125 g of Vazo-67 in 1.25 g of isopropanol at 30, 90, 150, 210, 270, 360, 480, 600, 720, 840, 960, 1020 and 1080 minutes.
12. Check the samples taken at 1020 and 1080 minutes for residual HEMA and DMAPMA.
13. When residual HEMA and DMAPMA levels are below 500 ppm and 2000 ppm, respectively, stop heating and cool down and transfer.

EXAMPLE 4

(A) Preparation in Water
  (1) 60/40 HEMA/DMAPMA wt ratio resulted in a gel.
  (2) 40/60 HEMA/DMAPMA wt ratio resulted in a gel.

EXAMPLE 5

(B) Preparation in IPA
  (1) 60/40 HEMA/DMAPMA wt ratio resulted in a low viscosity product with high residuals. HEMA 1.25% and DMAPMA 3.8%.
  (2) 30/70 HEMA/DMAPMA wt ratio resulted in a low viscosity product with high residuals. HEMA 0.45% and DMAPMA 3.5%.

EXAMPLE 6

(C) Preparation in IPA/Water
  (1) 30/70 HEMA/DMAPMA wt ratio resulted in a low viscosity product with moderate residuals. HEMA 0% and DMAPMA 1% residuals. IPA/water wt ratio 50/50.
  (2) 60/40 HEMA/DMAPMA wt ratio resulted in a high viscosity product with low residuals. HEMA 0% and DMAPMA 0.18% residuals. IPA/water wt ratio 50/50.
  (3) 60/40 HEMA/DMAPMA wt ratio resulted in a moderate viscosity product with moderate residuals. HEMA 0% and DMAPMA 1.5%. IPA/water wt ratio 80/20.
  (4) 30170 HEMA/DMAPMA wt ratio resulted in high viscosity product with low residuals. HEMA 0% and DMAPMA 0.12%. IPA/water wt ratio 56/44.
  (5) 40/60 HEMA/DMAPMA wt ratio resulted in a high viscosity product with low residuals. HEMA 0% and DMAPMA 0.13%. IPA/water wt ratio 54/46.

The copolymer of the invention was coated onto a polyester substrate which was used in a color inkjet printer. The color images produced were water-fastness, particularly the crosslinked product, and the solvent of inkjet color images absorbed rapidly with dry times of <1 min. and with excellent print quality, with both uncrosslinked and crosslinked products.

While the invention has been described with particular reference to certain embodiments thereof, it will be understood that changes and modifications may be made which are within the skill of the art. Accordingly, it is intended to be bound only by the following claims, in which:

What is claimed is:

1. A water-alcohol soluble copolymer of uncrosslinked or crosslinked dimethylaminopropyl methacrylamide (DMAPMA) and hydroxyethyl methacrylate (HEMA), having residual monomer levels of <2000 ppm and <500 ppm, respectively, made by copolymerizing DMAPMA and HEMA in an aqueous-alcohol solvent in a weight ratio of DMAPMA:HEMA of about 60–70:40–30.

2. A process of making the copolymer of claim 1 which comprises copolymerizing DMAPMA and HEMA in an aqueous-alcohol solvent.

3. A process according to claim 2 wherein said alcohol is isopropanol.

4. A process according to claim 2 wherein the wt ratio of DMAPMA:HEMA predetermines the weight ratio of water:alcohol cosolvent used, a higher HEMA content requiring a greater amount of alcohol in the cosolvent.

5. An aqueous-alcoholic solution of the copolymer of claim 1.

6. A solution according to claim 5 wherein said alcohol is isopropanol.

7. A solution according to claim 5 which has a pH of about 9–11, a solids content of about 29–31%, and a Brookfield viscosity of 1,000 to 20,000 cps [LV#4, 12 rpm @25° C.].

* * * * *